Sept. 11, 1928.   C. L. DAUN ET AL   1,683,608
BEARING
Filed Dec. 11, 1925

INVENTORS
C. L. Daun & P. E. Keller
BY
W. H. Lieber
ATTORNEY

Patented Sept. 11, 1928.

1,683,608

UNITED STATES PATENT OFFICE.

CARL L. DAUN AND PAUL E. KELLER, OF MILWAUKEE, WISCONSIN, ASSIGNORS, BY MESNE ASSIGNMENTS, TO AMERICAN ELECTRIC MOTOR COMPANY, OF MILWAUKEE, WISCONSIN.

BEARING.

Application filed December 11, 1925. Serial No. 74,666.

This invention relates in general to improvements in the art of supporting and lubricating rotary elements, and relates more specifically to improvements in the construction of, mode of assembling and dismantling, and operation of bearing and lubricating structures for rotary shafts or the like.

An object of the invention is to provide an improved bearing which is simple and compact in construction and efficient in operation. Another object of the invention is to provide improved bearing structure which may be conveniently constructed and readily assembled and dismantled. A further object of the invention is to provide improved means for preventing escape of fluid such as oil, from a bearing or housing, without the aid of packing. Still another object of the invention is to provide improvements in bearing construction whereby the cost of manufacture is reduced to a minimum and the efficiency of operation of such devices is enhanced to a maximum. These and other objects and advantages of the invention will be apparent in the course of the following description.

A clear conception of embodiments of the several novel features of the invention, and of the mode of assembling, dismantling and operating devices constructed in accordance therewith, may be had by referring to the drawing accompanying and forming a part of this specification in which like reference characters designate the same or similar parts in the various views.

Fig. 1 is a central vertical section taken longitudinally through an improved bearing structure and fluid confining devices for rotary shaft elements or the like.

Figure 1:
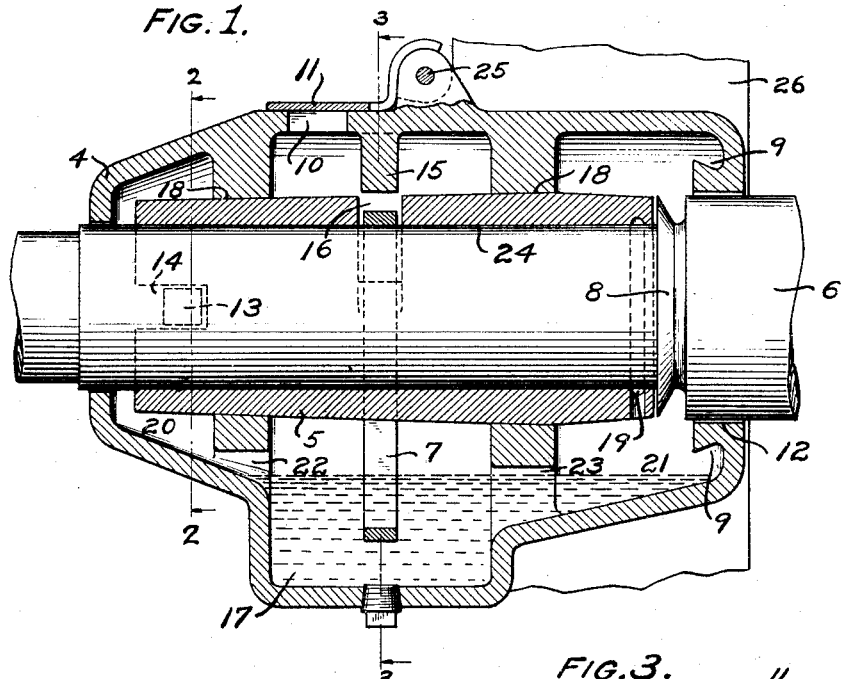
Figure 2:
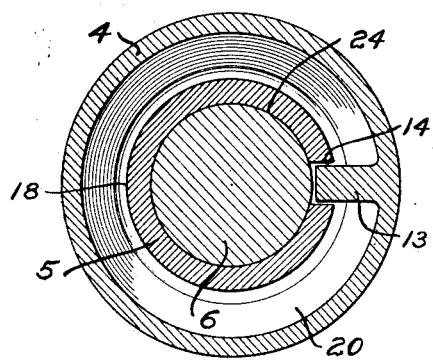
Fig. 2 is a transverse vertical section through the improved bearing structure, taken along the line 2—2 of Fig. 1 and looking in the direction of the arrows.
Figure 3:
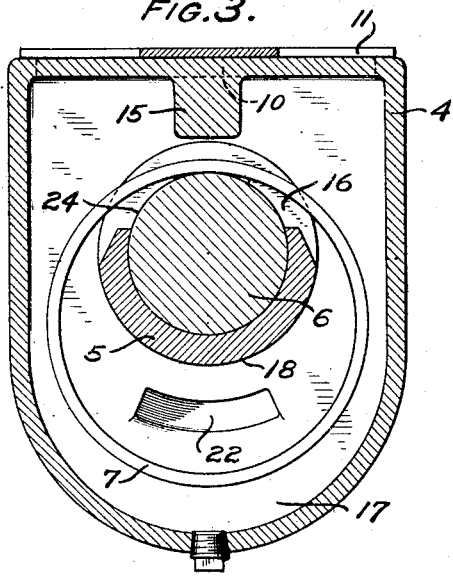
Fig. 3 is a transverse vertical section through the improved bearing structure, taken along the line 3—3 of Fig. 1 and looking in the direction of the arrows.

The improved bearing structure specifically illustrated in the drawing, comprises in general a one-piece housing 4 associated with a support 26 in any suitable manner and having a longitudinal tapered bore 18 therein; a bearing or sleeve member 5 located within the housing 4 and having an external tapered surface coacting with the member bore 18; a rotary shaft element 6 journaled in the bore 24 of the sleeve member 5 and extending through an end opening 12 of the housing 4; and a continuous or ring element 7 surrounding the shaft element 6 and disposed within a lateral recess 16 formed in the upper portion of the bearing member 5.

The housing 4 has an inwardly extending projection or lug 15 formed integral with and located within the upper portion of the housing, and also has an opening 10 located at one side of the lug 15 and extending laterally toward the common axis of the bore 18 and end opening 12. The opening 10 is of sufficient size to permit free insertion and removal of the ring element 7 therethrough, the opening 10 being normally sealed by means of a closure 11 which is swingably supported from the housing 4 by means of a pivot 25. The housing 4 is divided into two end chambers 20, 21 and an intermediate chamber 17 by means of transverse walls within which the housing bore 18 is formed, the latter chamber 17 having an oil well in the lower portion thereof and communicating with the end chambers 20, 21 through oil return openings 22, 23 respectively, formed in the transverse walls.

Located within the end chamber 20 and formed integral with the housing 4, is an inwardly extending projection or lug 13. The bearing or sleeve member 5 has an end recess 14 formed to receive the housing lug 13 and to lock the sleeve member 5 against rotation after this member has been inserted endwise into the bore 18 of the housing 4. An annular groove or recess 9 formed in the housing 4, completely surrounds the end housing opening 12 within the end chamber 21. Associated with the shaft element 6 and located between the end of the bearing element 5 and the groove 9, is an annular oil thrower 8 which has a maximum diameter less than the internal diameter of the housing opening 12. As shown, the oil thrower 8 is formed integral with the shaft element 6 and has an end face cooperating with the end of the sleeve member 5 to retain the member 5 within the housing bore 18. The sleeve member 5 is provided with an internal groove 19 adjacent to the oil thrower 8 and communicating through a lower opening with the chamber 21.

In order to assemble the bearing structure, it is first necessary to insert the ring element 7 into the medial chamber 17 of the housing 4 through the upper opening 10 at the left of the ring retaining lug 15 as viewed in Fig. 1, and to shift the element 7 to the right of the lug 15 within the housing. When the ring element 7 has been thus positioned at the right of the lug 15, the sleeve member 5 may be inserted through the end opening 12 of the housing and passed through the ring element 7 until the element 7 drops into the member recess 16 and rests within the recess 16. After the ring element 7 has been so positioned, the sleeve member 5 may be driven into the tapered bore 18 of the housing 4 by means of the element 6, until the lateral recess 16 is disposed directly beneath the lug 15, and the end recess 14 engages the lug 13 to positively prevent rotation of the member 5 within the housing 4. With the parts thus completely assembled, the ring element 7 dips into the oil basin provided in the lower portion of the housing chamber 17, and the oil thrower 8 cooperates with the end of the sleeve member 5 to positively prevent endwise displacement of the member 5 within the housing 4.

The normal operation of the assembled bearing structure is as follows:—The shaft element 6 during its rotation, causes the ring element 7 to rotate at a relatively lower speed and to elevate oil from the basin at the bottom of the chamber 17. The elevated oil flows from the member recess 16 along the bearing surface 24 toward both ends of the sleeve member 5. The oil delivered from the end of the member 5 into the end chamber 20 gravitates back into the chamber 17 through the return opening 22, while the oil delivered into the end chamber 21 from the groove 19, likewise gravitates into the chamber 17 through the return opening 23. In case some of the oil flows beyond the groove 19 and the adjacent end of the sleeve member 5, the revolving oil thrower automatically slings this oil outwardly against the wall surrounding the chamber 21 from whence it gravitates back to the main oil well in the chamber 17 through the opening 23. If any of the oil which is thrown against the wall of the chamber 21 should travel toward the outer end wall of this chamber, such oil eventually gravitates into and along the annular groove 9 and is deposited within the lower portion of the chamber 21 without coming in contact with the shaft element 6. The oil is thus effectively prevented from escaping from the housing 4 through the end bore 12, by the oil thrower 8 and the annular recess 9, without necessitating the use of packing at the opening 12.

In order to dismantle the bearing structure, it is desirable to initially draw off the oil by removing the plug at the bottom of the chamber 17, after which the shaft element 6 may be freely withdrawn from within the bore 24 through the end opening 24 together with the oil thrower 8. When the shaft element 6 has been removed, the sleeve member 5 may be driven from within the bore 18 until the lateral recess 16 has assumed a position to the right of the retaining lug 15 as viewed in Fig. 1. The ring element 7 may then be removed from the recess 16 in any convenient manner, whereupon the sleeve member 5 may be completely withdrawn from the bore 18 and from the housing 4 through the end opening 12. The removal of the ring element 7 from within the recess 16 may obviously be effected by tipping the bearing structure up-side down, or by so forming the end recess 14 and lug 13 that the member 5 may be rotated 180 degrees after the lateral recess 16 is clear of the lug 15, or by chamfering the left side of the recess 16 so that the element 7 will be elevated out of the recess by wedging action when the member 5 is shifted to the right and the element 7 engages the wall at the right side of the chamber 17. When the sleeve member 5 has been removed from the housing 4, the ring element 7 may be withdrawn through the opening 10 in an obvious manner thereby completing the dismantling operation.

From the foregoing description, it will be apparent that the invention provides an extremely simple and compact and highly efficient bearing structure which may be conveniently manufactured and readily assembled or dismantled. All of the surfaces may be machined by turning and boring and the parts are automatically and effectively locked in assembled position by the shaft element 6 and the lugs 13, 15. The one-piece housing 4 besides insuring rigidity of construction, provides an oil-tight enclosure in which the lubricant is effectively distributed and circulated. The cooperating oil thrower 8 and recess 9 effectively prevent escape of oil along the shaft element 6 while permitting formation of the opening 12 of sufficient size to enable free endwise insertion and withdrawal of the element 6, thrower 8 and member 5 therethrough, and such an assemblage of oil escape preventing elements may obviously be applied at the opposite end of the housing 4, if desired.

It should be understood that it is not desired to limit the invention either by the use of specific terms or otherwise, to the exact details of construction herein shown and described, for various modifications within the scope of the claims may occur to persons skilled in the art.

It is claimed and desired to secure by Letters Patent:—

1. The combination of a housing having an internal seat, a bearing member insertable lengthwise into said seat and having a longitudinally tapered portion for engagement therein, interlocking means automatically engaged by the insertion of said member to prevent rotation of said member within said housing, a shaft journalled in said member and cooperating therewith to retain the same against withdrawal, a recess in said member and a lubricating element disposed in said recess, and riding on said shaft, said lubricating element being moved into said recess by movement of said bearing member into its seat.

2. The combination of a housing having a fixed internal lug, a bearing member insertable lengthwise into said housing, a recess in said member, an endless lubricating element receivable within said recess and advanced by the insertion of said member into confined position beneath said lug, and a shaft journaled in said member and supporting said element.

3. The combination of a housing having a fixed internal lug, a bearing member insertable lengthwise into non-rotative interlocking engagement within said housing, a recess in said member, an endless lubricating element receivable within said recess and advanced by the insertion of said member into confined position beneath said lug, and a shaft journaled in said member, and coacting therewith to prevent withdrawal thereof.

4. The combination of a housing having an internal lug, a bearing member insertable lengthwise into said housing, a recess in said member, a lubricating element receivable within said recess and adapted to be rotated by a shaft, said element being advanced by the insertion of said member, into confined position in the recess and beneath said lug, and a shaft journaled in said member and supporting said element.

In testimony whereof, the signatures of the inventors are affixed hereto.

CARL L. DAUN.
PAUL E. KELLER.